United States Patent [19]

Negishi

[11] Patent Number: 5,390,037
[45] Date of Patent: Feb. 14, 1995

[54] LIQUID CRYSTAL MOLECULE ORIENTING METHOD

[75] Inventor: Yuji Negishi, Tachikawa, Japan

[73] Assignee: Casio Computer Co., Ltd., Tokyo, Japan

[21] Appl. No.: 113,838

[22] Filed: Aug. 30, 1993

[30] Foreign Application Priority Data

Sep. 25, 1992 [JP] Japan .................. 4-279203

[51] Int. Cl.⁶ .................................... C09K 19/00
[52] U.S. Cl. ............................ 359/76; 156/229; 156/324; 428/1
[58] Field of Search ............ 428/1; 156/324, 229; 359/76

[56] References Cited

U.S. PATENT DOCUMENTS

4,973,373  11/1990  Hashimoto et al. ............ 428/1 X

FOREIGN PATENT DOCUMENTS

| 0156721 | 6/1989 | Japan | 359/76 |
|---|---|---|---|
| 1156721 | 6/1989 | Japan | 359/76 |
| 0055327 | 2/1990 | Japan | 359/76 |
| 2-55327 | 2/1990 | Japan | 359/76 |
| 2-203321 | 8/1990 | Japan . | |

*Primary Examiner*—David A. Simmons
*Assistant Examiner*—M. Curtis Mayes
*Attorney, Agent, or Firm*—Frishauf, Holtz, Goodman & Woodward

[57] ABSTRACT

A method of efficiently orienting liquid crystal molecules on an orientation film formed on one surface of a film substrate which constitutes part of a liquid crystal display panel. In this method, the film substrate is conveyed between a rubbing roll and a backup roll disposed opposite the rubbing roll such that the orientation film faces the rubbing roll, that the rubbing and backup rolls are rotated in contact with the film substrate to thereby rub the orientation film formed on the film substrate for orienting the liquid crystal molecules. Thus, the orientation film formed on the film substrate is continuously rubbed while the film substrate is being conveyed to thereby achieve efficient rubbing.

9 Claims, 4 Drawing Sheets

LIQUID CRYSTAL MOLECULE ORIENTING METHOD

BACKGROUND OF THE INVENTION

1. Field of the Invention

The present invention relates to methods of processing an orientation film to orient liquid crystal molecules thereon for use in a liquid crystal display panel.

2. Background Art

One conventional method of orienting liquid crystal molecules for use in a liquid crystal display panel is to rub a surface of an orientation film, provided on a surface of a substrate which composes a part of the liquid crystal display panel, with a rubbing roll in one direction. When a film substrate is used as the substrate, rubbing film substrates having a given length corresponding to respective liquid crystal display panels is inefficient. Thus, a long film substrate from which many substrates for many liquid crystal display panels can be made at a time is rubbed in a tensile state between roll units.

FIG. 4 shows a part of a conventional orientation device used in such orientation process, in which an elongate film lamination 1 is conveyed intermittently in the direction of an arrow A along an upper surface of a stage 2. The film lamination 1 is composed of a film substrate, a transparent electrode of ITO (Indium Tin Oxide) or the like (not shown) formed on an upper surface of the substrate, and an orientation film of a resin such as polyimide formed on an upper surface of the electrode (not shown). A rubbing roll 3 is disposed above the stage 2. The roll 3 is made of a roll core and a nappy cloth wound around the roll core. The roll 3 is rotatable in a horizontal plane around the midpoint of its length in order to set a rubbing angle thereof, movable vertically, movable in the direction of arrow C while rotating in the direction of arrow B and movable in the direction opposite to the direction of arrow C.

When the film lamination 1 which is conveyed intermittently in the direction of arrow A stops, the rubbing roll 3 the rubbing angle of which is set moves from the down position shown by the solid line in FIG. 4 in the direction of arrow C to come into contact with a surface of the orientation film in a predetermined range on the film lamination 1. At this time, the rubbing roll 3 rotates in the direction of arrow B opposite to the direction of arrow C to thereby rub the surface of the orientation film of the film lamination 1 in the predetermined range in one direction. Thereafter, the roll 3 arrives at the position shown by the two-dot chain line in FIG. 4, rises, moves in the direction opposite to the direction of arrow C, arrives at the position shown by the solid line in FIG. 4 and then lowers. During the movement of the roll 3 in the direction opposite to the direction of arrow C, the film lamination 1 is conveyed by a predetermined distance in the direction of A.

Since the film lamination 1 is rubbed when it is at a stop in the conventional orienting method, however, conveyance of the film lamination 1 is stopped each time rubbing is performed. Thus, the problem is that productivity is low.

Since the film lamination 1 is conveyed intermittently, and if the accuracy of the stopping position of the film lamination 1 is low, the trailing end of the orientation film in a rubbing range and the leading end of the orientation film in the next rubbing range would overlap, so that a doubly rubbed area of the film lamination would result or no rubbed area would result. Thus, the stopping position of the film lamination 1 is required to have a high accuracy.

Unless the upper surface of the stage 2 is parallel to the plane of movement of the rubbing roll 3, uneven rubbing would result. Thus, high accuracy of parallelism is required between the upper surface of the stage 2 and the plane of movement of the rubbing roll 3.

SUMMARY OF THE INVENTION

It is therefore an object of the present invention to provide a liquid crystal molecule orienting process which improves productivity and provides uniform rubbing without requiring high accuracy of the stopping position and high degree of parallelism between the upper surface of the stage and the plane of movement of the rubbing roll.

According to the present invention, there is provided a method of orienting liquid crystal molecules on an orientation film, comprising the steps of:

preparing a film lamination including a film substrate and an orientation film formed on one surface of the film substrate, a rubbing roll, and a backup roll disposed opposite to the rubbing roll;

conveying the film lamination between the rubbing and backup rolls such that the orientation film of the film lamination faces the rubbing roll;

bringing the rubbing roll into contact with the orientation film formed on the one surface of the film substrate, and the backup roll into contact with the other surface of the film substrate; and rotating the rubbing and backup rolls.

DETAILED DESCRIPTION

Figure 1A:
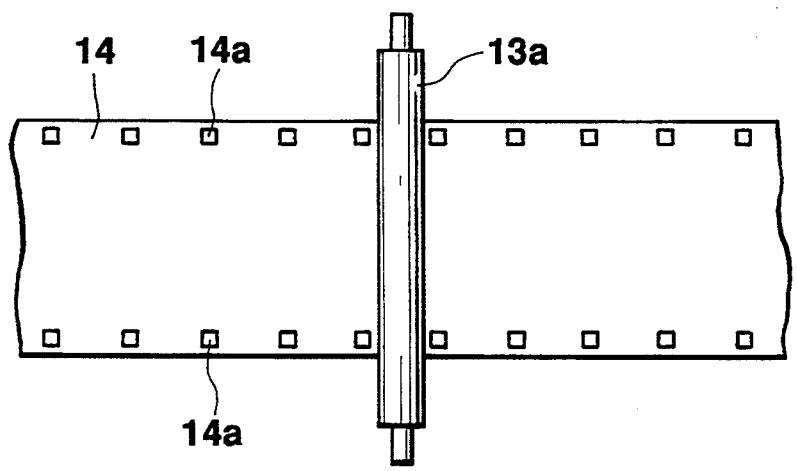
FIG. 1(A) is a plan view of an essential portion of an orientation device on standby as one embodiment of the present invention and a film lamination extending through the orientation device.
Figure 1B:
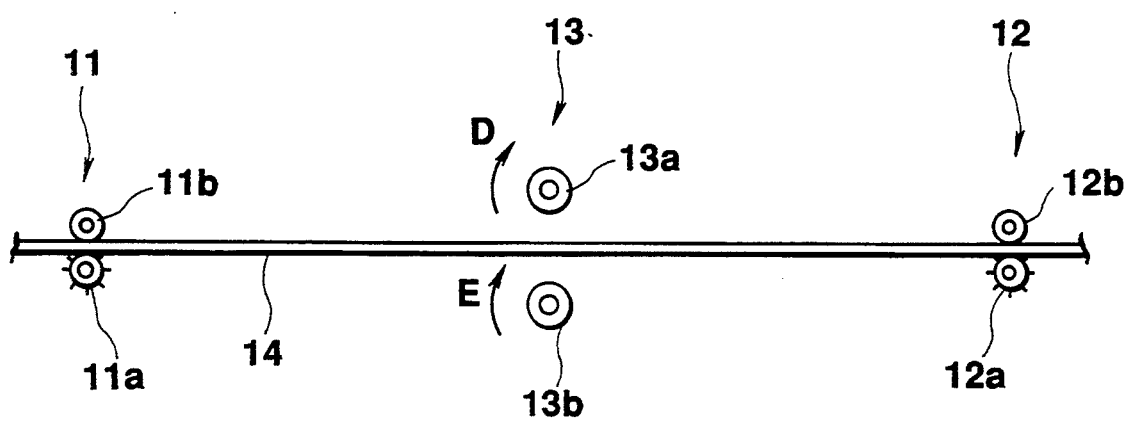
FIG. 1(B) is a front view of the orientation device of FIG. 1(A) on standby and the film lamination extending through the orientation device.

FIGS. 1(A) and 1(B) show an essential portion of an orientation device on standby as one embodiment of the present invention and a film lamination extending through the orientation device. The orientation device has a structure in which a rubbing unit 13 is provided between an inlet-side film lamination conveyance unit 11 and an outlet-side film lamination conveyance unit 12. The inlet-side conveyance unit 11 is provided with a sprocket 11a and a press roll 11b disposed above and opposite the sprocket 11a. The outlet-side conveyance unit 12 is provided with a sprocket 12a and a press roll 12b disposed above and opposite the sprocket 12a. The rubbing unit 13 is provided with a rubbing roll 13a having an outer diameter of 120 mm and a backup roll 13b having an outer diameter of 120 mm disposed under and opposite the rubbing roll 13a. The rubbing roll 13a is composed of a nappy cloth wound around a roll core. The rubbing roll 13a and the backup roll 13b each are movable vertically and rotatable around the midpoint of its length in a horizontal plane in order to set a rubbing angle. The rubbing roll 13a is rotated in the direction of arrow D and the backup roll 13b is rotated in the direction of arrow E. The elongate film lamination 14 has a series of sprocket holes 14a provided along each of the sides thereof, and includes a film substrate, a transparent electrode of ITO (Indium Tin Oxide) (not shown) or the like formed on an upper surface of the substrate and an orientation film of polyimide (not shown) or the like formed on the upper surface of the transparent electrode.

The film lamination 14 is conveyed in the direction of arrow F (FIG. 2) between the inlet-side sprocket 11a and the inlet-side press roll 11b; between the rubbing roll 13a and the backup roll 13b; and between the outlet-side sprocket 12a and the outlet-side press roll 12b with the teeth of the sprockets 11a, 12a engaged in the sprocket holes 14a arranged along each of the film lamination sides in a tensile state between the sprockets 11a and 12a. In the standby state, the rubbing roll 13a is positioned perpendicular to the film lamination 14 at an upper position while the backup roll 13b is positioned parallel to the rubbing roll 13a at a lower position.

The film substrate is made of PET (polyethyleneterephthalate), PES (polyethersulfone) or polyimide transparent to light and has a thickness of about 1.1–1.0 mm.

Figure 2A:
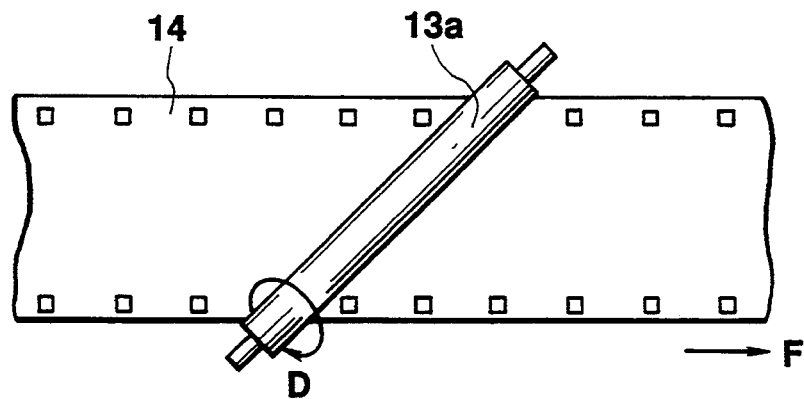
FIG. 2(A) is a plan view of the orientation device of FIG. 1(A) in a rubbing state and the film lamination extending through the orientation device.
Figure 2B:
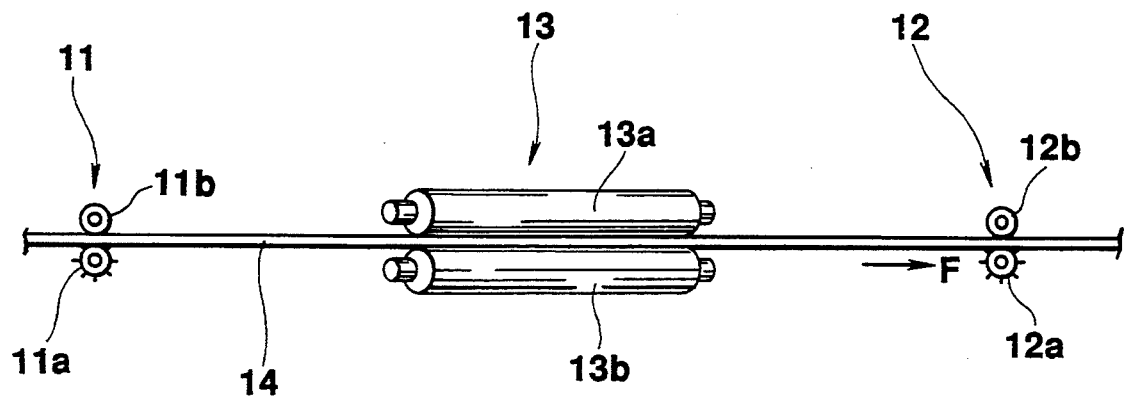
FIG. 2(B) is a front view of the orientation device of FIG. 2(A) in the rubbing state and the film lamination extending through the orientation device.
Figure 2C:
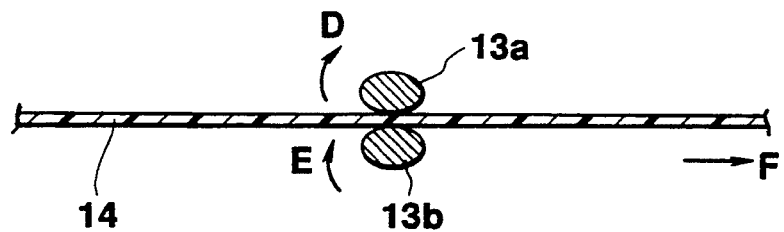
FIG. 2(C) is a longitudinally cross-sectional view of the orientation device of FIG. 2(A) and the film lamination extending through the orientation device.

Rubbing of the orientation film using the orientation device will be described below with respect to FIGS. 2(A)–2(C). First, the rubbing roll 13a and the backup roll 13b are rotated at the respective midpoints of the lengths thereof in a horizontal plane such that the axes of the rolls 13a and 13b are at predetermined rubbing angles to the direction of conveyance of the film lamination 14. The rubbing roll 13a is then lowered and the backup roll 13b is lifted such that the rubbing roll 13a is brought into contact with an upper surface of the orientation film of the film lamination 14 and the backup roll 13b is brought into contact with a lower surface of the substrate. Both the sprockets 11a, 12a are clockwise rotated synchronously in FIG. 2(B) to convey the film lamination 14 continuously at a rate of 1 meter/minute in the direction of arrow F. The rubbing roll 13a is rotated in the direction of arrow D opposite to the direction of conveyance of the film lamination 14 (or in the direction of hindering the conveyance of the film lamination 14) while the backup role 13b is rotated in the same direction of arrow E as the film lamination 14 synchronously with the conveyance rate of the film lamination 14 (or in the direction of following the conveyance of the film lamination 14). The rotational speed of the rubbing roll 13a is 500–2,000 rpm while the backup roll 13b rotates synchronously with the conveyance of the film lamination 14. Thus, the surface of the orientation film of the film lamination 14 conveyed continuously between the rubbing and backup rolls 13a and 13b is rubbed continuously by the rubbing roll 13a.

As just described above, since the orientation device rubs the film lamination 14 while conveying it, the film lamination 14 is not required to be at a stop during rubbing to thereby improve productivity. Since the film lamination 14 is rubbed continuously while being conveyed continuously, neither a doubly rubbed area nor an unrubbed area results. Thus, no high accuracy of the stopping position is required to bring about satisfactory rubbing. The accuracy of the spacing between the rubbing and backup rolls 13a and 13b is easily increased compared to the accuracy of parallelism between the upper surface of the stage and the plane of movement of the rubbing roll in the conventional techniques. Thus, uniform rubbing is achieved.

Figure 3A:
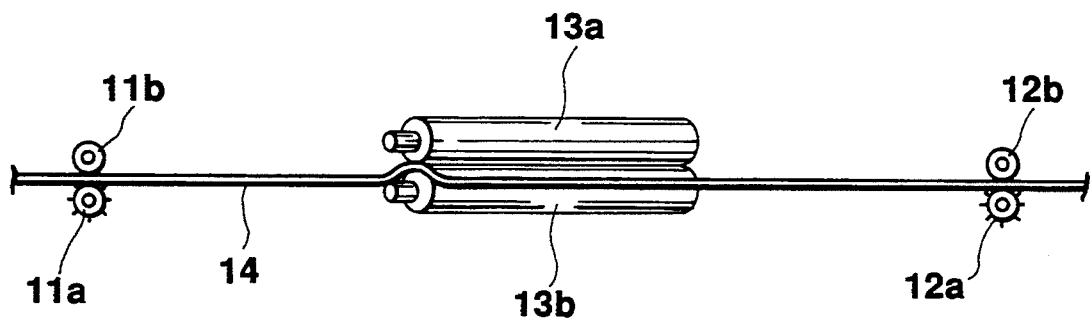
FIG. 3(A) is a plan view of an essential portion of an orientation device in a rubbing state as another embodiment of the present invention and a film lamination extending through the orientation device.
Figure 3B:
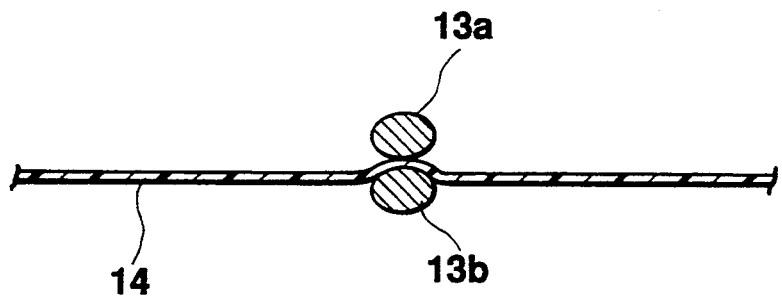
FIG. 3(B) is a longitudinally cross-sectional view of the orientation device of FIG. 3(A) and the film lamination extending through the orientation device.
Figure 4:
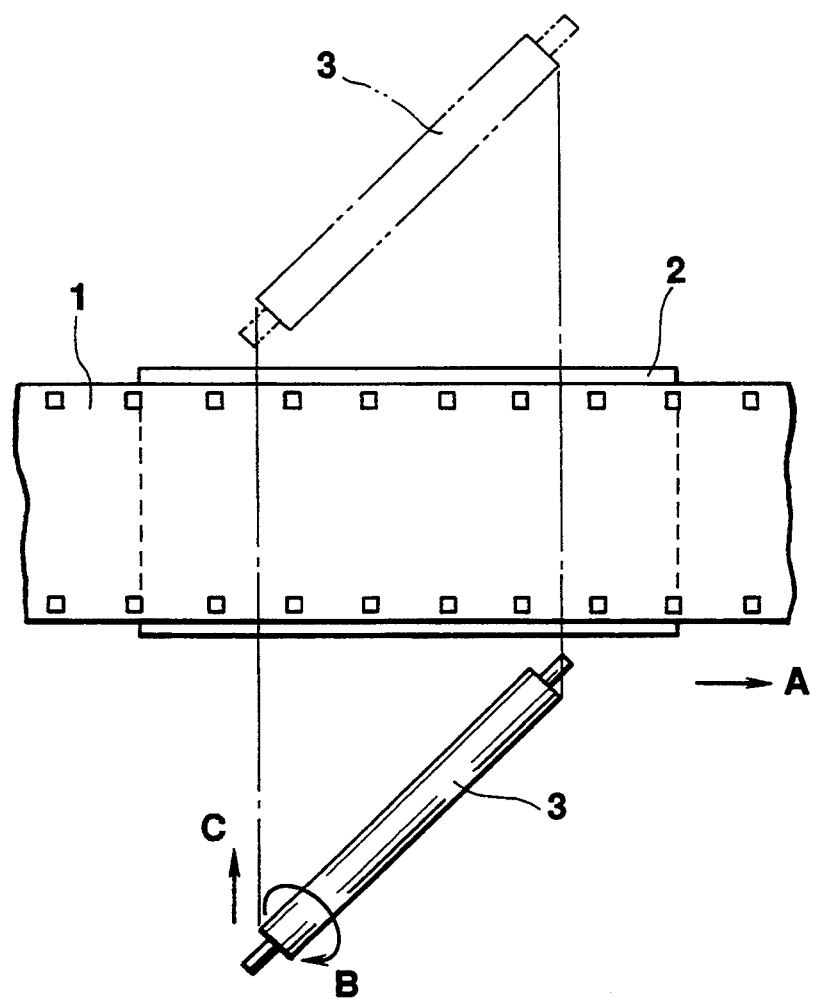
FIG. 4 is a plan view of an essential portion of a conventional orientation device and a film lamination extending through the orientation device.

While in the above embodiment the film lamination 14 is conveyed horizontally in a tensile state during rubbing, the present invention is not limited to this embodiment. For example, as shown in FIGS. 3(A), (B), the film lamination 14 may be conveyed in a state properly lifted partially by the backup roll 13b during rubbing. At this time, the backup roll 13b presses the film lamination 14 to displace a portion of the lamination out of its plane of conveyance. In other words, the film lamination 14 is partially guided along the peripheral surface of the backup roll 13b and is allowed to rapidly escape from the rubbing roll 13a. This causes the contact of the orientation film of the film lamination 14 with the rubbing roll 13a to approach line contact rather than surface contact. As a result, the area of contact between the rubbing roll 13a and the orientation film of the film lamination 14 is reduced. Uneven rubbing in the area of contact is reduced or improved rubbing is achieved. In addition, wear of the rubbing cloth of the rubbing roll 13a is reduced and hence the service life of the rubbing cloth is prolonged.

What is claimed is:

1. In a device which processes an orientation film used in a liquid crystal display panel, the orientation film being formed on one surface of a film substrate, and serving to orientate liquid crystal molecules included in the liquid crystal display panel, the orientation film and the film substrate forming a film lamination, and the device comprising a resilient rubbing roll and a backup roll disposed opposite to the resilient rubbing roll, for holding and feeding the film lamination, a method of processing the orientation film comprising the steps of:

conveying the film lamination between the rubbing and backup rolls such that the orientation film of the film lamination faces the rubbing roll;

bringing the rubbing roll into contact with the orientation film formed on the one surface of the film substrate and bringing the backup roll into contact with the other surface of the film substrate so that part of the film lamination is displaced from a plane of conveyance of the film lamination and Partially guided along the peripheral surface of the backup roll due to a pressing action by the backup roll to thereby reduce the area of contact between the orientation film of the film lamination and the rubbing roll.

2. A method according to claim 1, wherein the bringing steps comprise placing the axes of the rubbing and backup rolls at predetermined angles to the direction of conveyance of the film lamination.

3. A method according to claim 2, wherein the film lamination is an elongated one.

4. A method according to claim 3, further comprising the step of rotating the rubbing roll in the direction of hindering the conveyance of the film lamination while rotating the backup roll in a direction following the direction of conveyance of the film lamination.

5. A method according to claim 2, further comprising the steps of rotating the rubbing roll in the direction of hindering the conveyance of the film lamination while rotating the backup roll in a direction following the direction of conveyance of the film lamination.

6. A method according to claim 1, wherein the film lamination is an elongated one.

7. A method according to claim 6, further comprising the step of rotating the rubbing roll in the direction of hindering the conveyance of the film lamination while rotating the backup roll in a direction following the direction of conveyance of the film lamination.

8. A method according to claim 1, further comprising the step of rotating the rubbing roll in the direction of hindering the conveyance of the film lamination while rotating the backup roll in a direction following the direction of conveyance of the film lamination.

9. In a device which processes an orientation film used in a liquid crystal display panel, the orientation film being formed on one surface of a film substrate, and serving to orientate liquid crystal molecules included in the liquid crystal display panel, and which comprises a resilient rubbing roll and a backup roll disposed opposite to the resilient rubbing roll, for holding and feeding the film substrate, a method of processing the orientation film comprising the steps of:

conveying the film substrate and the orientation film between the rubbing roll and the backup-roll such that the orientation film formed on the one surface of the film substrate faces the rubbing roll;

bringing the rubbing roll into contact with the orientation film formed on the one surface of the film substrate and bringing the backup roll into contact with the other surface of the film substrate so that part of the film substrate is displaced from a plane of conveyance of the film substrate and partially guided along the peripheral surface of the backup roll due to a pressing action by the backup roll to reduce the area of contact between the orientation film and the rubbing roll.

* * * * *